United States Patent
Chang et al.

(10) Patent No.: US 10,411,333 B1
(45) Date of Patent: Sep. 10, 2019

(54) ELECTRONIC DEVICE

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/163,848

(22) Filed: Oct. 18, 2018

(30) Foreign Application Priority Data

Aug. 24, 2018 (TW) .............................. 107129650 A (51) Int. Cl.
| | |
|---|---|
| *H04M 1/00* | (2006.01) |
| *H01Q 1/36* | (2006.01) |
| *G06F 1/16* | (2006.01) |
| *H01Q 5/50* | (2015.01) |
| *H01Q 5/392* | (2015.01) |

(52) U.S. Cl.
CPC .............. *H01Q 1/36* (2013.01); *G06F 1/1698* (2013.01); *H01Q 5/392* (2015.01); *H01Q 5/50* (2015.01)

(58) Field of Classification Search
CPC ........................................................ H01Q 1/36
See application file for complete search history.

(56) References Cited

U.S. PATENT DOCUMENTS

| | | | | |
|---|---|---|---|---|
| 6,842,143 B2 * | 1/2005 | Otaka | ...................... | H01Q 1/36 343/700 MS |
| 2003/0016177 A1 * | 1/2003 | Deguchi | ................ | H01Q 1/242 343/702 |
| 2006/0238423 A1 * | 10/2006 | Ozden | .................... | H01Q 1/243 343/702 |
| 2018/0323502 A1 * | 11/2018 | Lee | ........................ | H01Q 1/242 |

* cited by examiner

*Primary Examiner* — Justin Y Lee
(74) *Attorney, Agent, or Firm* — McClure, Qualey & Rodack, LLP (57) ABSTRACT

An electronic device includes a dielectric substrate, a first radiation element, a second radiation element, a third radiation element, and a sensing pad. The first radiation element includes a first branch, a second branch, and a first connection element. The first connection element is coupled between the first branch and the second branch. The second branch is coupled to a ground voltage. The second radiation element has a feeding point. The third radiation element is coupled to the feeding point. An antenna structure is formed by the first radiation element, the second radiation element, and the third radiation element. The sensing pad includes a third branch, a fourth branch, and a second connection element. The second connection element is coupled between the third branch and the fourth branch. The second connection element has a meandering structure.

10 Claims, 7 Drawing Sheets

ELECTRONIC DEVICE

CROSS REFERENCE TO RELATED APPLICATIONS

This Application claims priority of Taiwan Patent Application No. 107129650 filed on Aug. 24, 2018, the entirety of which is incorporated by reference herein.

BACKGROUND OF THE INVENTION

Field of the Invention

The disclosure generally relates to an electronic device, and more particularly, to an electronic device for integrating an antenna structure and a sensing pad.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna element is an essential component of a mobile device for wireless communication. In order to meet the requirements of SAR (Specific Absorption Rate) set by the government, designers may control the RF (Radio Frequency) power relative to the antenna element by incorporating a proximity sensor (P-sensor) into the mobile device. However, a sensing pad of the proximity sensor tends to negatively affect the antenna element and even causes the antenna element to generate undesired resonant modes. As a result, there is a need to propose a novel solution for solving the problems of the prior art.

BRIEF SUMMARY OF THE INVENTION

In a preferred embodiment, the invention is directed to an electronic device including a dielectric substrate, a first radiation element, a second radiation element, a third radiation element, and a sensing pad. The dielectric substrate has a first surface and a second surface which are opposite to each other. The first radiation element includes a first branch, a second branch, and a first connection element. The first connection element is coupled between the first branch and the second branch. The second branch is coupled to a ground voltage. The second radiation element has a feeding point. A first coupling gap is formed between the second radiation element and the first branch. The third radiation element is coupled to the feeding point. A second coupling gap is formed between the third radiation element and the first branch. The second radiation element and the third radiation element are at least partially surrounded by the first radiation element. The sensing pad is coupled to a proximity sensor. The sensing pad includes a third branch, a fourth branch, and a second connection element. The second connection element is coupled between the third branch and the fourth branch. The second connection element has a meandering structure. The first radiation element, the second radiation element, and the third radiation element are disposed on the first surface of the dielectric substrate. The sensing pad is disposed on the second surface of the dielectric substrate. An antenna structure is formed by the first radiation element, the second radiation element, and the third radiation element.

In some embodiments, the width of the first connection element is much greater than the width of the first branch and the width of the second branch.

In some embodiments, the third radiation element further includes an inverted-U-shaped bending portion, such that an end of the third radiation element and an end of the second radiation element substantially extend in the same direction.

In some embodiments, the first branch has a first vertical projection on the second surface of the dielectric substrate, and the first vertical projection completely overlaps the third branch. The second branch has a second vertical projection on the second surface of the dielectric substrate, and the second vertical projection completely overlaps the fourth branch. The first connection element has a third vertical projection on the second surface of the dielectric substrate, and the third vertical projection at least partially overlaps the second connection element.

In some embodiments, the length of the third radiation element is substantially equal to the length of the first branch or the length of the second branch.

In some embodiments, the width of the first coupling gap is from 0.5 mm to 2 mm, and the width of the second coupling gap is from 0.5 mm to 2 mm.

In some embodiments, the antenna structure covers a first frequency band from 704 MHz to 960 MHz, a second frequency band from 1710 MHz to 2170 MHz, and a third frequency band from 2300 MHz to 2700 MHz.

In some embodiments, the first radiation element, the second radiation element, and the third radiation element are excited to generate the first frequency band and the third frequency band. The second radiation element is excited to generate the second frequency band.

In some embodiments, the length of the second radiation element is substantially equal to 0.25 wavelength of the second frequency band.

In some embodiments, the first connection element substantially has a rectangular shape. The length of the first connection element is at least 8 mm, and the width of the first connection element is at least 5 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
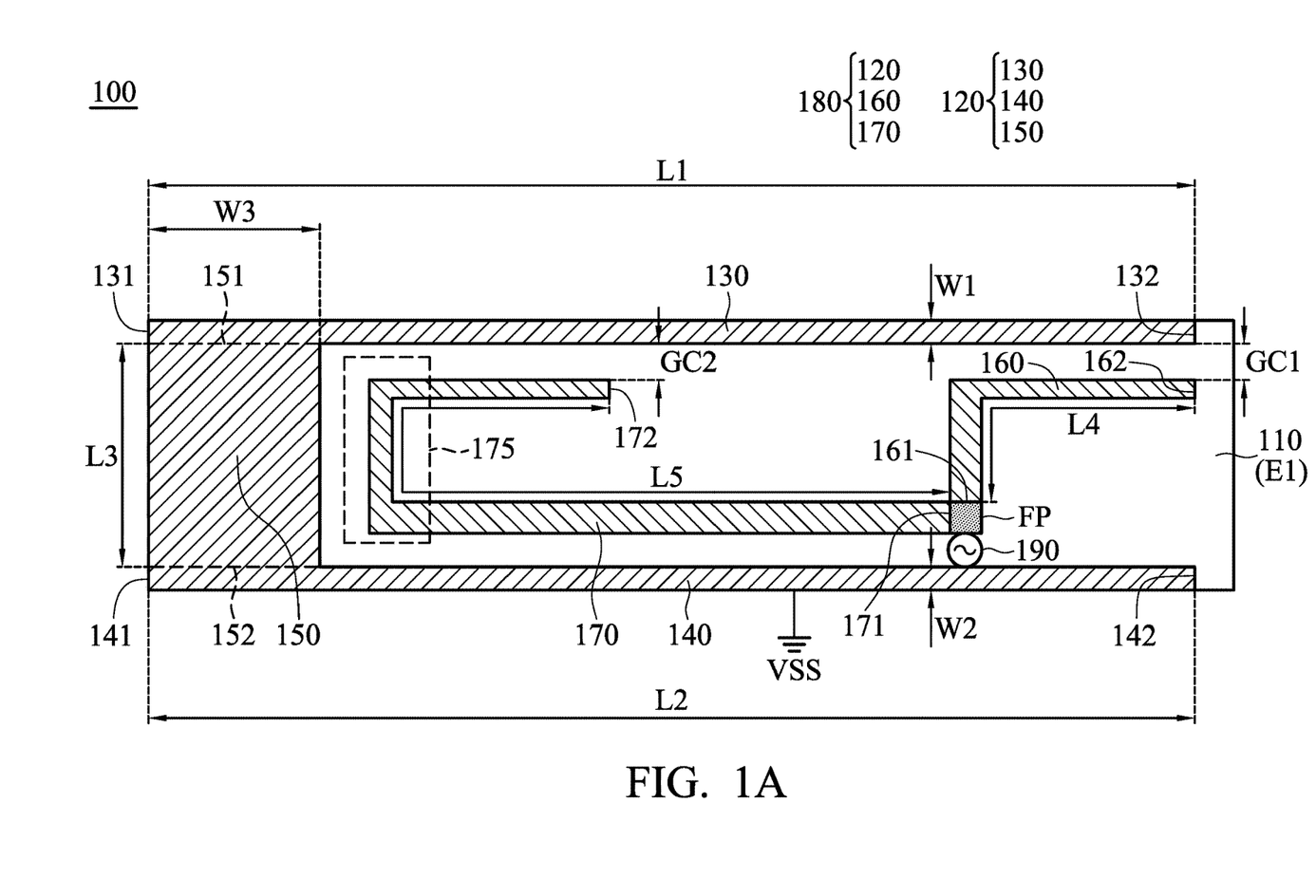
FIG. 1A is a top view of an electronic device according to an embodiment of the invention.
Figure 1B:
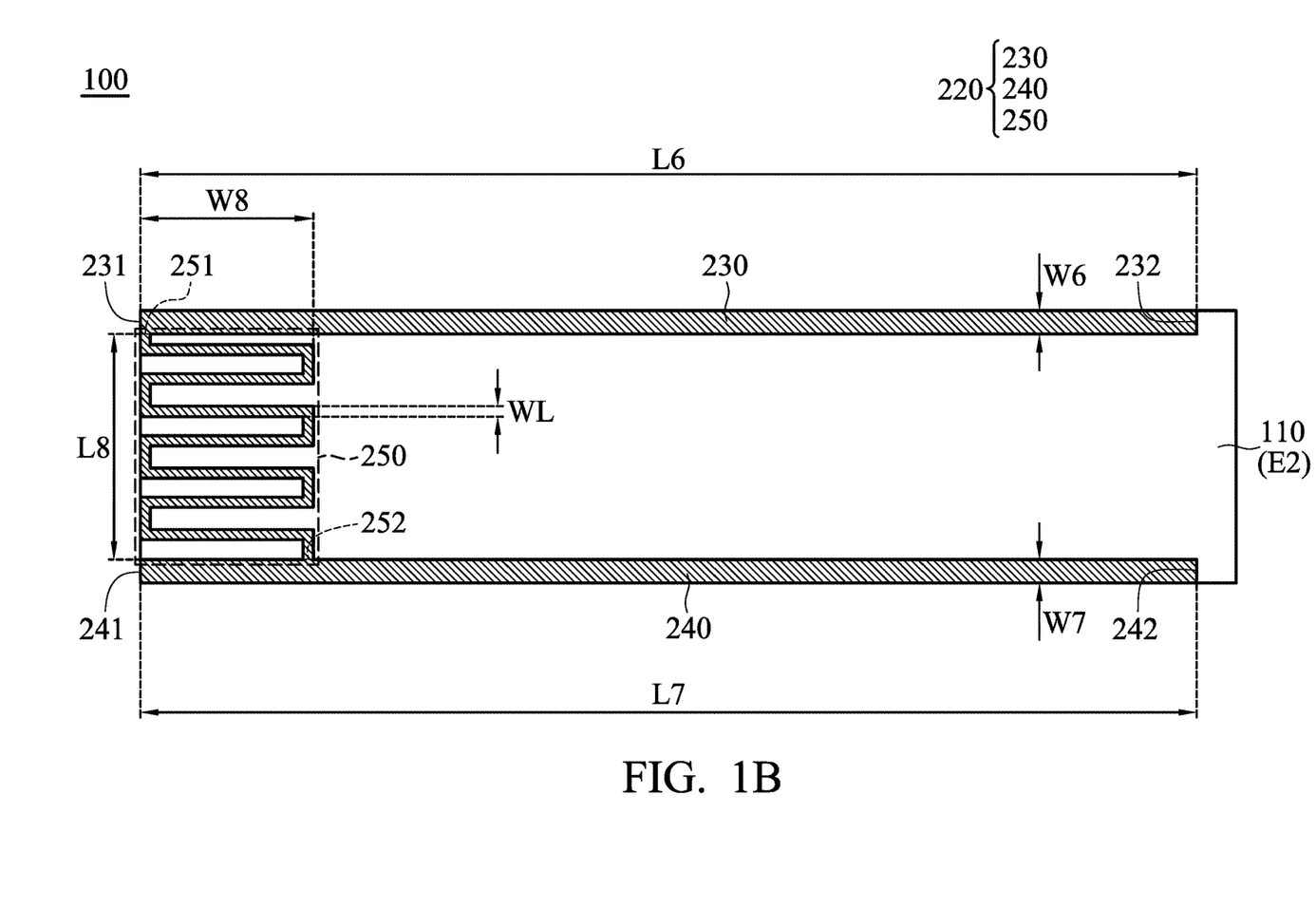
FIG. 1B is a back view of an electronic device according to an embodiment of the invention.
Figure 1C:
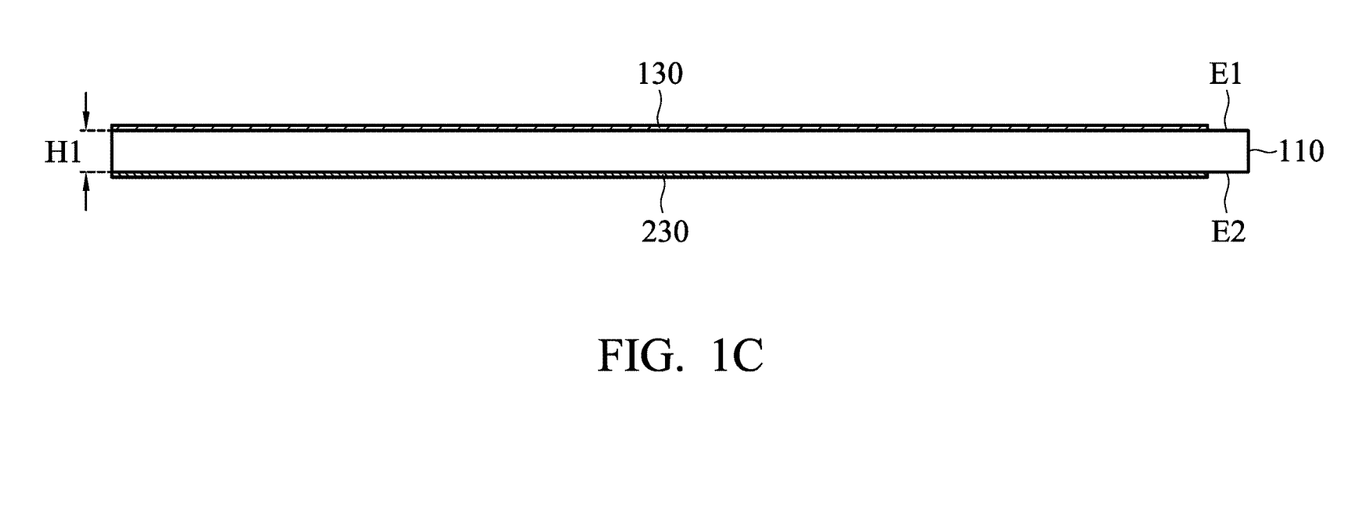
FIG. 1C is a side view of an electronic device according to an embodiment of the invention.

FIG. 1A is a top view of an electronic device 100 according to an embodiment of the invention. FIG. 1B is a back view of the electronic device 100 according to an embodiment of the invention. FIG. 1C is a side view of the electronic device 100 according to an embodiment of the invention. Please refer to FIG. 1A, FIG. 1B, and FIG. 1C together. The electronic device 100 may be applicable to a mobile device, such as a smartphone, a tablet computer, or a notebook computer. In the embodiment of FIG. 1A, FIG. 1B, and FIG. 1C, the electronic device 100 includes a dielectric substrate 110, a first radiation element 120, a second radiation element 160, a third radiation element 170, and a sensing pad 220. In some embodiments, the first radiation element 120, the second radiation element 160, the third radiation element 170, and the sensing pad 220 are all made of metal materials, such as copper, silver, aluminum, iron, or their alloys.

The dielectric substrate 110 may be an FR4 (Flame Retardant 4) substrate, a PCB (Printed Circuit Board), or an FCB (Flexible Circuit Board). The dielectric substrate 110 has a first surface E1 and a second surface E2 which are opposite to each other. The first radiation element 120, the second radiation element 160, and the third radiation element 170 are disposed all on the first surface E1 of the dielectric substrate 110. The sensing pad 220 is disposed on the second surface E2 of the dielectric substrate 110.

The first radiation element 120 may substantially have an inverted U-shape. Specifically, the first radiation element 120 includes a first branch 130, a second branch 140, and a first connection element 150. The first connection element 150 is coupled between the first branch 130 and the second branch 140. The second branch 140 is coupled to a ground voltage VSS (e.g., 0V). The ground voltage VSS may be provided by a ground copper foil of a mobile device (not shown). The first branch 130 may substantially have a straight-line shape. The first branch 130 has a first end 131 and a second end 132. The first end 131 of the first branch 130 is coupled to a first side 151 of the first connection element 150. The second end 132 of the first branch 130 is an open end. The second branch 140 may substantially have a straight-line shape. The second branch 140 has a first end 141 and a second end 142. The first end 141 of the second branch 140 is coupled to a second side 152 of the first connection element 150. The second end 142 of the second branch 140 is an open end. The first connection element 150 may substantially have a rectangular shape. The width W3 of the first connection element 150 is much greater than the width W1 of the first branch 130 and the width W2 of the second branch 140. The first branch 130 and the second branch 140 may be substantially parallel to each other. Both the first branch 130 and the second branch 140 may be substantially perpendicular to the first connection element 150.

The second radiation element 160 may substantially have an inverted L-shape. Specifically, the second radiation element 160 has a first end 161 and a second end 162. A feeding point FP is positioned at the first end 161 of the second radiation element 160. The second end 162 of the second radiation element 160 is an open end. The feeding point FP may be coupled to a signal source 190. For example, the signal source 190 may be an RF (Radio Frequency) module for generating a transmission signal or a reception signal. A first coupling gap GC1 is formed between the second end 162 of the second radiation element 160 and the first branch 150 of the first radiation element 120.

The third radiation element 170 may substantially have an inverted J-shape. Specifically, the third radiation element 170 has a first end 171 and a second end 172. The first end 171 of the third radiation element 170 is coupled to the feeding point FP. The second end 172 of the third radiation element 170 is an open end. Both the second radiation element 160 and the third radiation element 170 are at least partially surrounded by the first radiation element 120. For example, both the second radiation element 160 and the third radiation element 170 may be positioned between the first branch 130 and the second branch 140 of the first radiation element 120. A second coupling gap GC2 is formed between the second end 172 of the third radiation element 170 and the first branch 130 of the first radiation element 120. In some embodiments, the third radiation element 170 further includes an inverted-U-shaped bending portion 175, such that the second end 172 of the third radiation element 170 and the second end 162 of the second radiation element 160 substantially extend in the same direction. It should be noted that an antenna structure 180 of the electronic device 100 is formed by the first radiation element 120, the second radiation element 160, and the third radiation element 170.

The sensing pad 220 may substantially have an inverted U-shape. Specifically, the sensing pad 220 includes a third branch 230, a fourth branch 240, and a second connection element 250. The second connection element 250 is coupled between the third branch 230 and the fourth branch 240. The third branch 230 may substantially have a straight-line shape. The third branch 230 has a first end 231 and a second end 232. The first end 231 of the third branch 230 is coupled to a first end 251 of the second connection element 250. The second end 232 of the third branch 230 is an open end. The fourth branch 240 may substantially have a straight-line shape. The fourth branch 240 has a first end 241 and a second end 242. The first end 241 of the fourth branch 240 is coupled to a second end 252 of the second connection element 250. The second end 242 of the fourth branch 240 is an open end. The second connection element 250 may substantially have a meandering structure. For example, the second connection element 250 may be substantially a W-shape or a combination of a plurality of U-shapes connected to each other, and the total number of U-shapes may be 2, 3, 4, 5 or more, but they are not limited thereto. The meandering line width WL of the second connection element 250 may be smaller than or equal to the width W6 of the third branch 230 and the width W7 of the fourth branch 240.

In some embodiments, the first branch 130 of the first radiation element 120 has a first vertical projection on the second surface E2 of the dielectric substrate 110, and the whole first vertical projection overlaps the third branch 230 of the sensing pad 220. The second branch 140 of the first radiation element 120 has a second vertical projection on the second surface E2 of the dielectric substrate 110, and the whole second vertical projection overlaps the fourth branch 240 of the sensing pad 220. The first connection element 150 of the first radiation element 120 has a third vertical projection on the second surface E2 of the dielectric substrate 110, and the third vertical projection at least partially overlaps the second connection element 250 of the sensing pad 220.

Figure 2:
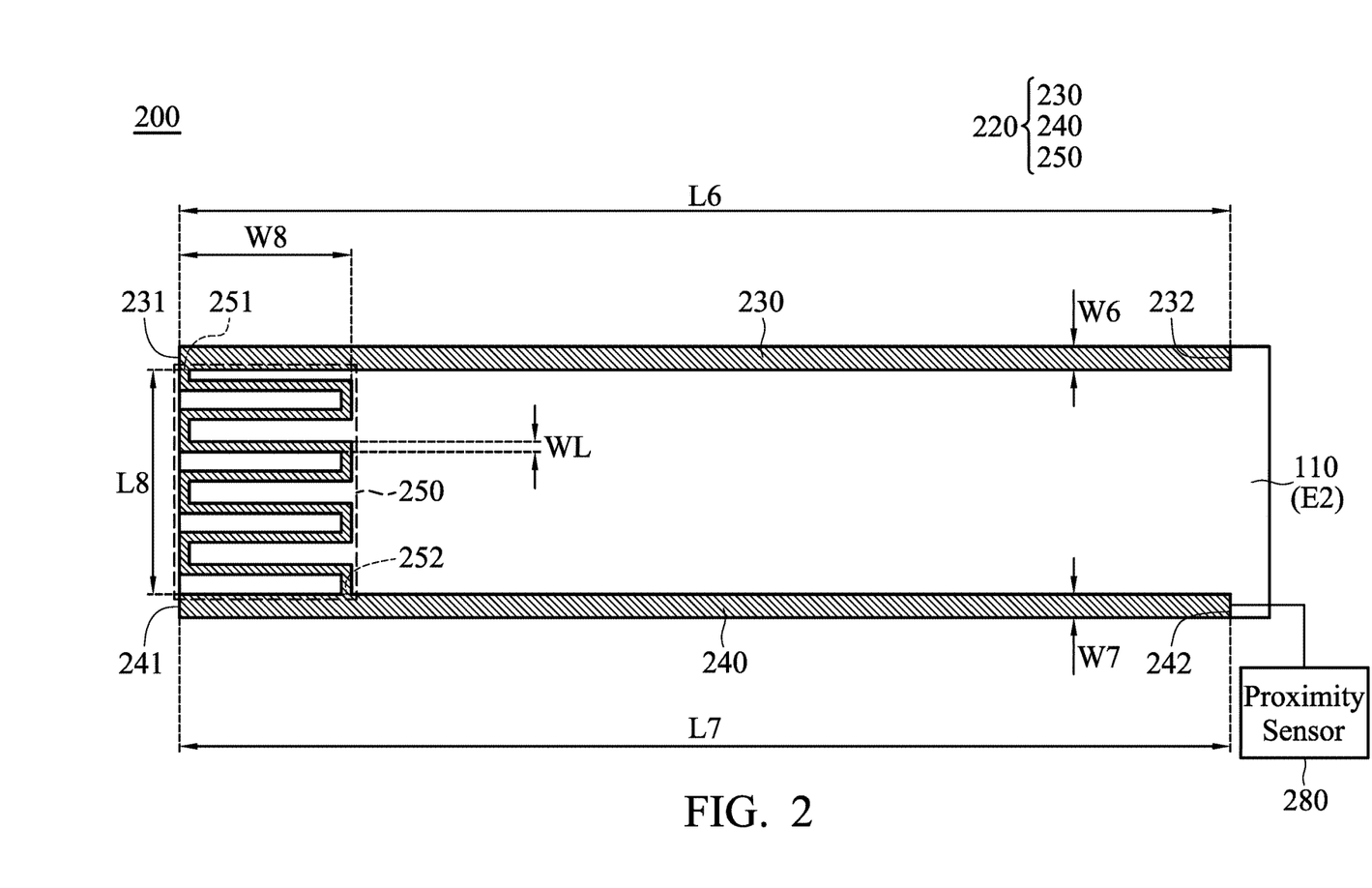
FIG. 2 is a top view of an electronic device according to another embodiment of the invention.

FIG. 2 is a top view of an electronic device 200 according to another embodiment of the invention. FIG. 2 is similar to FIG. 1. In the embodiment of FIG. 2, the electronic device 200 further includes a proximity sensor (P-sensor) 280. The proximity sensor 280 is coupled to the second end 242 of the fourth branch 240 of the sensing pad 220. In alternative embodiments, the proximity sensor 280 is coupled to the second end 232 of the third branch 230 of the sensing pad 220. Other features of the electronic device 200 of FIG. 2 are similar to those of the electronic device 100 of FIG. 1. Accordingly, the two embodiments can achieve similar levels of performance.

Figure 3:
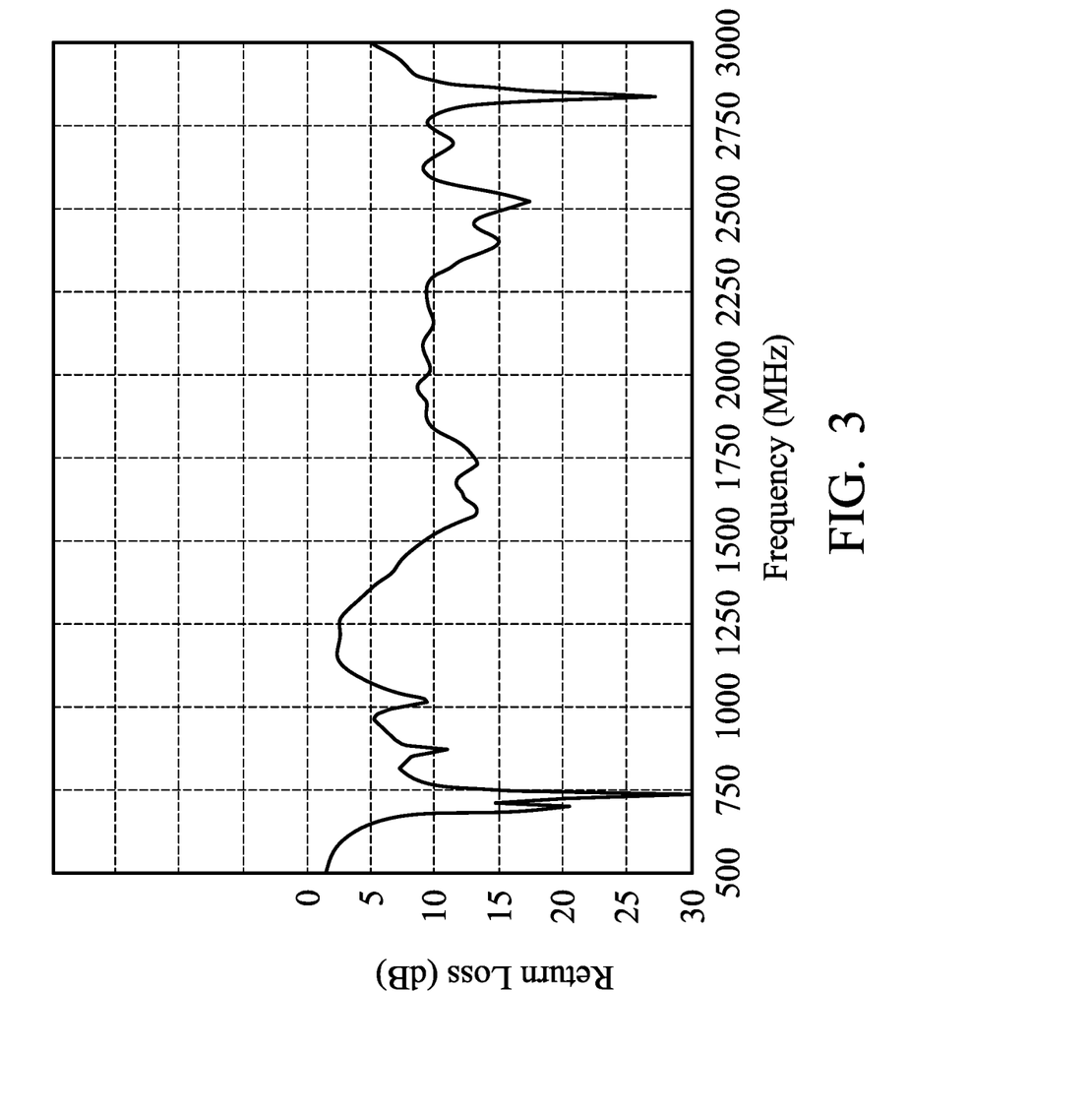
FIG. 3 is a diagram of return loss of an antenna structure when a sensing pad does not include a meandering second connection element.

FIG. 3 is a diagram of return loss of the antenna structure 180 when the sensing pad 220 does not include the meandering second connection element 250. The horizontal axis represents the operation frequency (MHz), and the vertical axis represents the return loss (dB). According to the measurement of FIG. 3, if the second connection element 250 of the sensing pad 220 has a rectangular shape (instead of the meandering structure), the antenna structure 180 may tend to be interfered with by the sensing pad 220, thereby inducing many undesired resonant modes. In other words, if the sensing pad 220 and the first radiation element 120 have very similar shapes, the radiation performance of the antenna structure 180 may be seriously affected.

Figure 4:
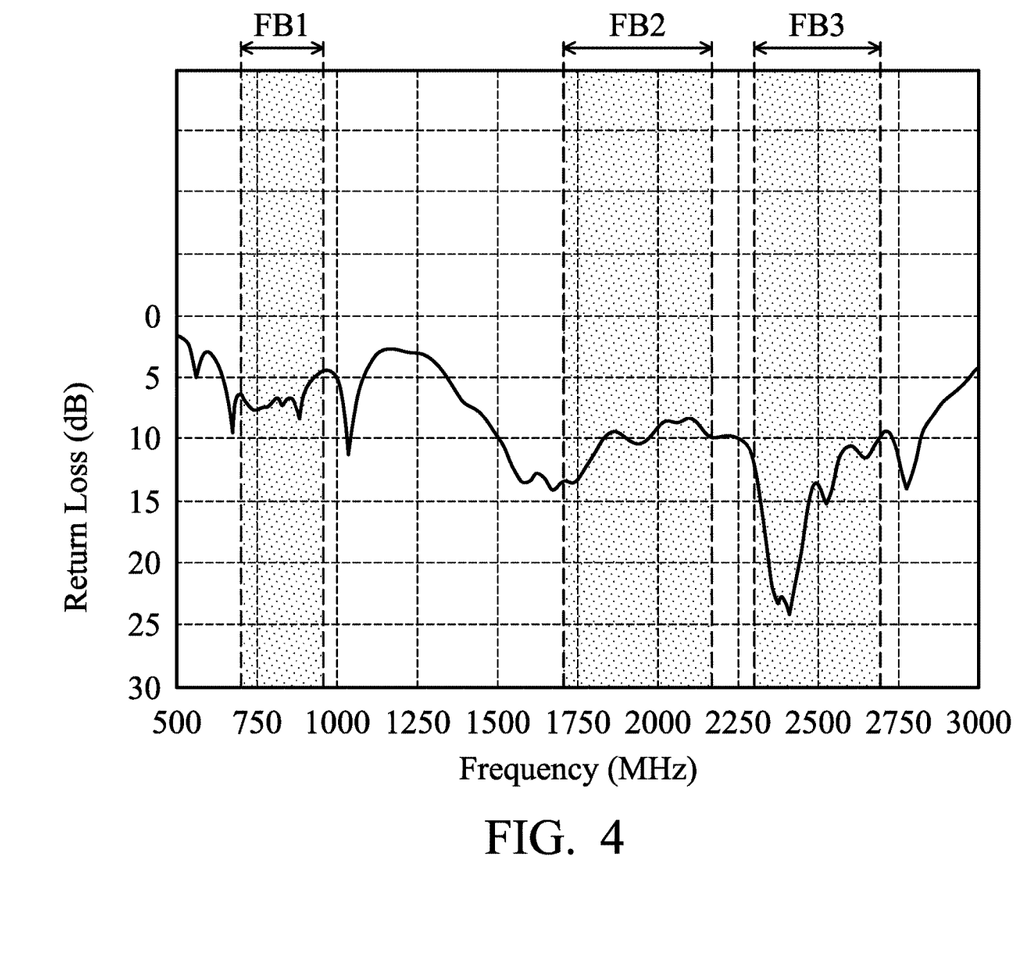
FIG. 4 is a diagram of return loss of an antenna structure of an electronic device according to an embodiment of the invention.

FIG. 4 is a diagram of return loss of the antenna structure 180 of the electronic device 100 according to an embodiment of the invention. The horizontal axis represents the operation frequency (MHz), and the vertical axis represents the return loss (dB). According to the measurement of FIG. 4, if the second connection element 250 of the sensing pad 220 has a meandering structure (as shown in FIG. 1B), it can reduce the interference between the sensing pad 220 and the first radiation element 120, thereby effectively suppressing the undesired resonant modes of the antenna structure 180. With such a design, the antenna structure 180 of the electronic device 100 can cover a first frequency band FB1, a second frequency band FB2, and a third frequency band FB3. For example, the first frequency band FB1 may be from about 704 MHz to about 960 MHz, the second frequency band FB2 may be from about 1710 MHz to about 2170 MHz, and the third frequency band FB3 may be from about 2300 MHz to about 2700 MHz. Accordingly, the antenna structure 180 of the electronic device 100 can support at least the wideband operations of LTE (Long Term Evolution).

In some embodiments, the operation principles of the antenna structure 180 of the electronic device 100 are as follows. The first radiation element 120, the second radiation element 160, and the third radiation element 170 are excited to generate the first frequency band FB1 and the third frequency band FB3. The third frequency band FB3 is considered as a double-frequency effect of the first frequency band FB1. Furthermore, the second radiation element 160 is independently excited to generate the second frequency band FB2.

Figure 5:
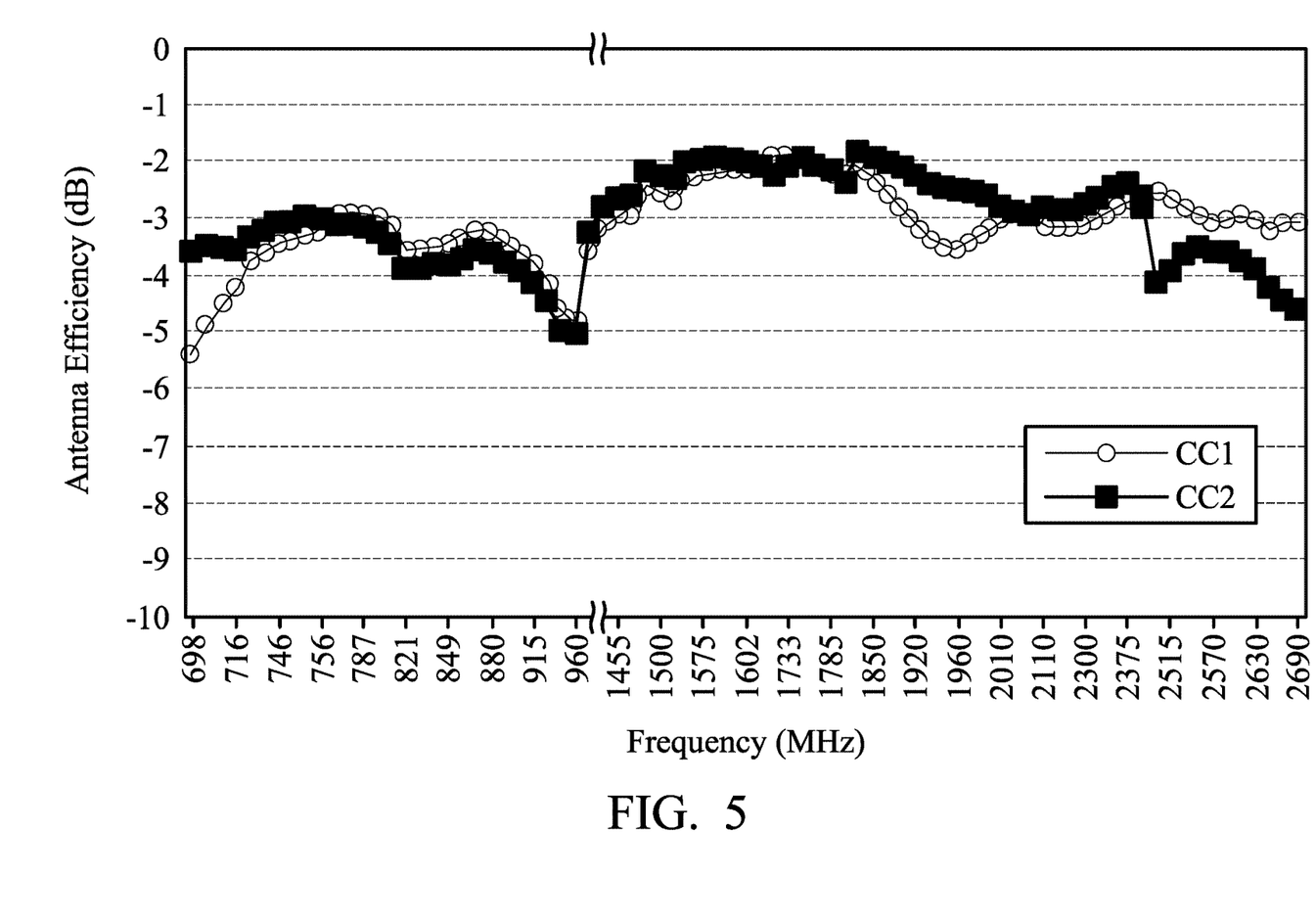
FIG. 5 is a diagram of antenna efficiency of an antenna structure of an electronic device according to an embodiment of the invention.

FIG. 5 is a diagram of antenna efficiency of the antenna structure 180 of the electronic device 100 according to an embodiment of the invention. The horizontal axis represents the operation frequency (MHz), and the vertical axis represents the antenna efficiency (dB). As shown in FIG. 5, a first curve CC1 represents the radiation efficiency of the antenna structure 180 when the sensing pad 220 does not include the meandering second connection element 250, and a second curve CC2 represents the radiation efficiency of the antenna structure 180 when the sensing pad 220 includes the meandering second connection element 250. Specifically, if the second connection element 250 of the sensing pad 220 has a meandering structure, it can reduce the capacitance between the antenna structure 180 and the sensing pad 220, so as to prevent the sensing pad 220 from negatively affecting the resonant modes of the antenna structure 180. According to the comparison of FIG. 5, the antenna efficiency of the antenna structure 180 of the electronic device 100 is increased by about 2 dB within the first frequency band FB1 after the meandering second connection element 250 is added, and it can meet the requirements of practical application of general mobile communication devices.

In some embodiments, the element sizes of the electronic device 100 are as follows. The thickness H1 of the dielectric substrate 110 (i.e., the distance between the first surface E1 and the second surface E2) may be from about 0.4 mm to about 1.6 mm. Among the first radiation element 120, the first branch 130 has a length L1 (i.e., the length from the first end 131 to the second end 132) and the first connection element 150 has a length L3 (i.e., the length from the first side 151 to the second side 152), and the sum of them (i.e., L1+L3) may be substantially equal to 0.25 wavelength (λ/4) of the central frequency of the first frequency band FB1. The width W1 of the first branch 130 may be about 1 mm. The length L2 of the second branch 140 (i.e., the length from the first end 141 to the second end 142) may be substantially equal to the length L1 of the first branch 130. The width W2 of the second branch 140 may be about 1 mm. The length L3 of the first connection element 150 may be greater than or equal to 8 mm. The width W3 of the first connection element 150 may be greater than or equal to 5 mm. The length L4 of the second radiation element 160 (i.e., the length from the first end 161 to the second end 162) may be substantially equal to 0.25 wavelength (λ/4) of the central frequency of the second frequency band FB2. The length L5 of the third radiation element 170 (i.e., the length from the first end 171 to the second end 172) may be substantially equal to the length L1 of the first branch 130 or the length L2 of the second branch 140. Among the sensing pad 220, the length L6 of the third branch 230 (i.e., the length from the first end 231 to the second end 232) may be substantially equal to the length L1 of the first branch 130, the length L7 of the fourth branch 240 (i.e., the length from the first end 241 to the second end 242) may be substantially equal to the length L2 of the second branch 140, the length L8 of the second connection element 250 may be substantially equal to the length L3 of the first connection element 150, and the width W8 of the second connection element 250 may be substantially equal to the width W3 of the first connection element 150. The meandering line width WL of the second connection element 250 may be from about 0.5 mm to about 1 mm. The width of the first coupling gap GC1 may be from about 0.5 mm to about 2 mm. The width of the second coupling gap GC2 may be from about 0.5 mm to about 2 mm. The above ranges of elements are calculated and obtained according to many experiment results, and they can help to optimize the operation bandwidth and the impedance matching of the antenna structure 180 of the electronic device 100.

The invention proposes a novel electronic device. By adding a meandering structure to the sensing pad, the invention not only enhances the radiation efficiency of the antenna structure (by about 30%) but also increases the detectable distance of the sensing pad (by about 10%). Furthermore, the invention improves the operation performance of the antenna structure and results in higher probability of passing the SAR (Specific Absorption Rate) testing procedure, and it is suitable for application in a variety of mobile communication devices.

Note that the above element sizes and element parameters are not limitations of the invention. A designer can fine-tune these settings or values according to different requirements. It should be understood that the electronic device of the invention is not limited to the configurations of FIGS. 1-5. The invention may include any one or more features of any one or more embodiments of FIGS. 1-5. In other words, not all of the features displayed in the figures should be implemented in the electronic device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An electronic device, comprising:
   a dielectric substrate, having a first surface and a second surface opposite to each other;
   a first radiation element, comprising a first branch, a second branch, and a first connection element, wherein the first connection element is coupled between the first branch and the second branch, and the second branch is coupled to a ground voltage;
   a second radiation element, having a feeding point, wherein a first coupling gap is formed between the second radiation element and the first branch;
   a third radiation element, coupled to the feeding point, wherein a second coupling gap is formed between the third radiation element and the first branch, and the second radiation element and the third radiation element are at least partially surrounded by the first radiation element; and
   a sensing pad, coupled to a proximity sensor, and comprising a third branch, a fourth branch, and a second connection element, wherein the second connection element is coupled between the third branch and the fourth branch, and the second connection element has a meandering structure;
   wherein the first radiation element, the second radiation element, and the third radiation element are disposed on the first surface of the dielectric substrate, and the sensing pad is disposed on the second surface of the dielectric substrate;
   wherein an antenna structure is formed by the first radiation element, the second radiation element, and the third radiation element.

2. The electronic device as claimed in claim 1, wherein a width of the first connection element is much greater than a width of the first branch and a width of the second branch.

3. The electronic device as claimed in claim 1, wherein the third radiation element further comprises an inverted-U-shaped bending portion, such that an end of the third radiation element and an end of the second radiation element substantially extend in a same direction.

4. The electronic device as claimed in claim 1, wherein the first branch has a first vertical projection on the second surface of the dielectric substrate, the first vertical projection completely overlaps the third branch, the second branch has a second vertical projection on the second surface of the dielectric substrate, the second vertical projection completely overlaps the fourth branch, the first connection element has a third vertical projection on the second surface of the dielectric substrate, and the third vertical projection at least partially overlaps the second connection element.

5. The electronic device as claimed in claim 1, wherein a length of the third radiation element is substantially equal to a length of the first branch or a length of the second branch.

6. The electronic device as claimed in claim 1, wherein a width of the first coupling gap is from 0.5 mm to 2 mm, and a width of the second coupling gap is from 0.5 mm to 2 mm.

7. The electronic device as claimed in claim 1, wherein the antenna structure covers a first frequency band from 704 MHz to 960 MHz, a second frequency band from 1710 MHz to 2170 MHz, and a third frequency band from 2300 MHz to 2700 MHz.

8. The electronic device as claimed in claim 7, wherein the first radiation element, the second radiation element, and the third radiation element are excited to generate the first frequency band and the third frequency band, and the second radiation element is excited to generate the second frequency band.

9. The electronic device as claimed in claim 7, wherein a length of the second radiation element is substantially equal to 0.25 wavelength of the second frequency band.

10. The electronic device as claimed in claim 7, wherein the first connection element substantially has a rectangular shape, a length of the first connection element is at least 8 mm, and a width of the first connection element is at least 5 mm.

* * * * *